(12) United States Patent
Zywot et al.

(10) Patent No.: US 12,704,156 B2
(45) Date of Patent: Aug. 11, 2026

(54) DISCONNECTOR SYSTEM FOR DISCONNECTING A DRIVE SHAFT

(71) Applicant: General Electric Company, Evendale, OH (US)

(72) Inventors: Jan Zywot, Chapel Hill, NC (US); Xiaochuan Jia, Centerville, OH (US); Dhaval Thaker, Sugarcreek Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/187,679

(22) Filed: Apr. 23, 2025

(65) Prior Publication Data

US 2025/0334153 A1 Oct. 30, 2025

Related U.S. Application Data

(60) Provisional application No. 63/638,216, filed on Apr. 24, 2024.

(51) Int. Cl.

| | |
|---|---|
| ***F16D 9/02*** | (2006.01) |
| ***F02C 7/32*** | (2006.01) |
| ***F02C 7/36*** | (2006.01) |
| ***F16D 9/08*** | (2006.01) |
| ***F16D 11/04*** | (2006.01) |
| ***F16D 23/12*** | (2006.01) |
| ***F16D 43/25*** | (2006.01) |

(52) U.S. Cl.

CPC ................ *F16D 23/12* (2013.01); *F02C 7/32* (2013.01); *F02C 7/36* (2013.01); *F16D 9/02* (2013.01); *F16D 9/08* (2013.01); *F16D 11/04* (2013.01); *F16D 43/25* (2013.01); *F16D 2023/123* (2013.01); *F16D 2300/18* (2013.01)

(58) Field of Classification Search

CPC ..... F16D 9/02; F16D 9/06; F16D 9/08; F16D 11/04; F16D 11/14; F16D 23/12; F16D 2023/123; F16D 43/25; F16D 47/02; F02C 7/32; F02C 7/36

USPC ........................................................ 192/69.2

See application file for complete search history.

(56) References Cited

U.S. PATENT DOCUMENTS 3,193,068 A 7/1965 Greve et al.
3,220,218 A * 11/1965 Russell .................... F16D 9/00 464/33
3,620,045 A 11/1971 Butterfield
3,620,046 A 11/1971 Wenzel et al.
3,675,444 A 7/1972 Whipple
4,086,991 A 5/1978 Swadley
4,232,772 A 11/1980 Brissey et al.

(Continued)

*Primary Examiner* — Richard M Lorence

(74) *Attorney, Agent, or Firm* — Thomas | Horstermeyer, LLP

(57) ABSTRACT

A disconnector system for disconnecting a drive shaft of a drive mechanism from rotating equipment, upon a failure of the drive mechanism or rotating equipment, includes a disconnector mechanism having a disconnector shaft disposed in a casing and moveable relative thereto, between a first position and a second position, and a cam surface on a distal end of the arm configured to engage a slidable coupler. The movement of the disconnector shaft can be triggered by an operation of a solenoid, or by a displacement of the solenoid responsive to a melting of a meltable element.

18 Claims, 6 Drawing Sheets

(56) References Cited

U.S. PATENT DOCUMENTS

| | | | | |
|---|---|---|---|---|
| 4,271,947 | A * | 6/1981 | Gaeckle | F16D 3/18 192/82 T |
| 4,934,977 | A * | 6/1990 | Falconer | F16D 9/02 192/82 T |
| 5,103,949 | A * | 4/1992 | Vanderzyden | F16D 11/04 192/24 |
| 6,364,772 | B1 | 4/2002 | Sugden | |
| 6,619,454 | B2 | 9/2003 | Hayward | |
| 8,122,781 | B2 | 2/2012 | Minke et al. | |
| 9,574,618 | B2 | 2/2017 | Lemmers | |
| 10,316,898 | B2 | 6/2019 | Wirsch et al. | |
| 10,760,619 | B2 | 9/2020 | King | |
| 11,387,706 | B2 | 7/2022 | Bloor | |
| 2019/0211749 | A1* | 7/2019 | Rodrigues | F16D 1/116 |
| 2023/0184175 | A1 | 6/2023 | Gontla et al. | |

* cited by examiner

DISCONNECTOR SYSTEM FOR DISCONNECTING A DRIVE SHAFT

CROSS REFERENCE TO RELATED PATENT APPLICATIONS

This application is, claims priority to, and the benefit of, U.S. Ser. No. 63/638,216, filed Apr. 24, 2024, and entitled "DISCONNECTOR SYSTEM FOR DISCONNECTING A DRIFT SHAFT," which is incorporated by reference herein in its entirety for all purposes.

TECHNICAL FIELD

The various embodiments of the present disclosure relate generally to a disconnector system for a drive shaft of a driving mechanism for rotating equipment.

BACKGROUND

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps. In the event of failure of the driving mechanism, it can be desirable to decouple the driving mechanism from the rotating equipment.

DETAILED DESCRIPTION

The present disclosure is related to a driving mechanism generating kinetic motion in the form of a rotating shaft coupled with a piece of rotating equipment. In the event of failure of the driving mechanism, the various embodiments of the present disclosure relate to decoupling the driving mechanism from the rotating equipment. The various embodiments provide a reliable and free of foreign object debris separation of the rotatable drive shaft from the driving mechanism. Aspects of the disclosure can be implemented in any environment, apparatus, or method having a rotatable shaft regardless of the function performed by the rotatable shaft. While aspects of the disclosure will be described herein, for ease of description and understanding in terms of a driving mechanism, other aspects are not so limited. One non-limiting example of a driving mechanism can include a gas turbine engine rotationally driving a piece of rotating equipment, such as a starter/generator (S/G). The S/G has various applications including starting a gas turbine engine and generating electrical power when the gas turbine engine is in operation. While the exemplary aspect described herein is directed to application of a gas turbine engine and an S/G, aspects of the disclosure can be applied to any implementation of a driving mechanism that generates rotational motion at a driving output, and provides the rotational motion to another piece of rotating equipment.

Figure 1:
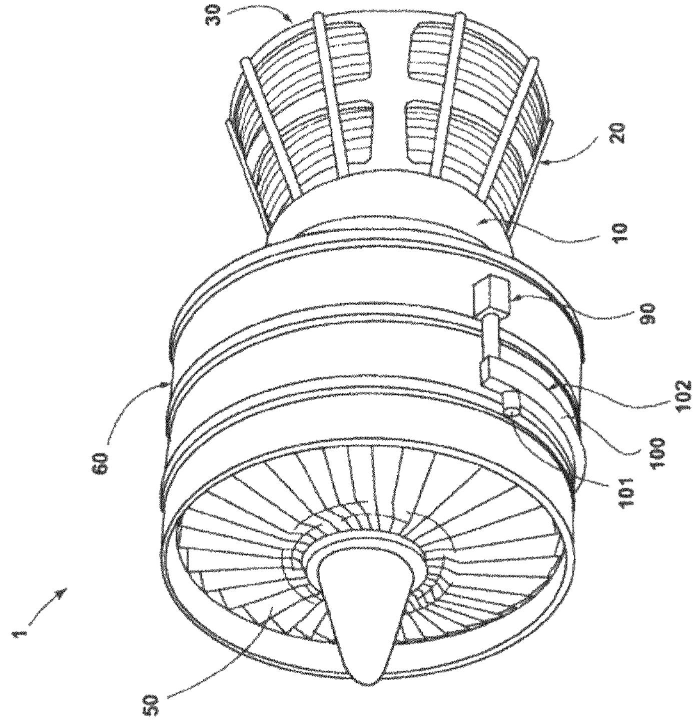
FIG. 1 is a schematic illustration of a gas turbine engine with an accessory gearbox in accordance with various aspects described herein.

Referring to FIG. 1, an assembly 102 comprising an accessory gear box (AGB) 100, also known as a transmission housing, and a starter/generator (S/G) 101 is schematically illustrated mounted to a gas turbine engine 1. This assembly is commonly referred to as an Integrated Starter/Generator Gearbox (ISGB). The gas turbine engine 1 comprises an air intake with a fan 50 that supplies air to a high-pressure compression region 60. The air intake with a fan 50 and the high-pressure compression region collectively are known as the 'cold section' of the gas turbine engine upstream of the combustion. The high-pressure compression region 60 provides the combustion chamber 10 with high-pressure air. In the combustion chamber, the high-pressure air is mixed with fuel and combusted. The hot and pressurized combusted gas passes through a high-pressure turbine region 20 and a low pressure turbine region 30 before exhausting from the gas turbine engine. As the pressurized gases pass through the high-pressure turbine (not shown) of the high-pressure turbine region 20 and the low pressure turbine (not shown) of the low pressure turbine region 30, the turbines extract rotational energy from the flow of the gases passing through the gas turbine engine 1. The high-pressure turbine of the high-pressure turbine region 20 can be coupled to the compression mechanism (not shown) of the high-pressure compression region 60 by way of a shaft to power the compression mechanism. The low pressure turbine can be coupled to the fan 50 of the air intake by way of a shaft to power the fan 50.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 30 to increase the velocity of the exhausted gases, and thereby increasing thrust.

The AGB 100 is coupled to a turbine shaft of the gas turbine engine 1, either to the low pressure or high-pressure turbine by way of a mechanical power take-off 90. The mechanical power take off 90 contains multiple gears and means for mechanical coupling of the AGB 100 to the gas turbine engine 1. The assembly 102 can be mounted on the outside of either the air intake region containing the fan 50 or on the core near the high-pressure compression region 60.

Figure 2:
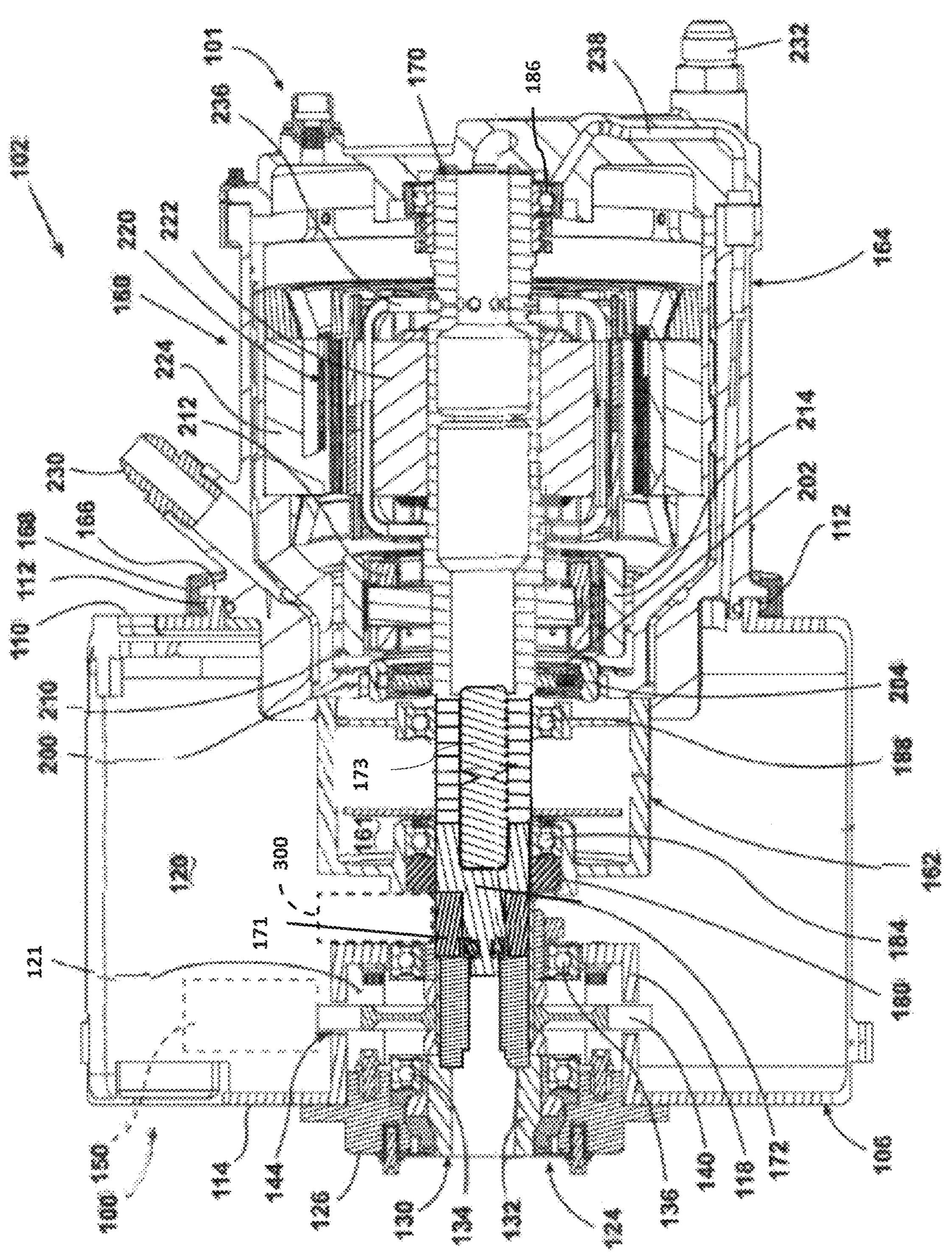
FIG. 2 is a sectional view of a starter/generator mounted to the accessory gearbox of FIG. 1 by way of a rotatable shaft, in accordance with various aspects described herein.

Referring now to FIG. 2, the relationship between the S/G 101 and the AGB 100 is shown in greater detail. The AGB comprises an AGB housing 106 with a front AGB wall 110 and an opposing back wall 114 with an AGB interior 120 enclosed therebetween. The back wall 114 of the AGB housing 106 can further define a cavity 121 with a sidewall 118 to accommodate a pinion gear assembly 124 therein. The pinion gear assembly 124 comprises a pinion gear assembly housing 126, a first shaft portion 132 rotatably mounted to the pinion gear assembly housing 126 and supported by a first spaced bearing 134 and a second spaced bearing 136. A pinion gear 140 is carried by the first shaft portion 132 for co-rotation and located between the first spaced bearing 134 and the second spaced bearing 136. An aperture 144 can be defined in the sidewall 118 through which the pinion gear 140 extends and meshes with a drive gear 150 (shown schematically as a dotted rectangle for clarity) driven by a gear train (not shown) coupled to the power take-off 90 of the gas turbine engine 1 (FIG. 1), such that operation of the engine 1 provides a driving motion to the AGB 100. The pinion gear 140 can be more proximate to the back wall 114 than the front AGB wall 110.

The AGB interior 120 can also contain oil (not shown) to provide lubrication and cooling to mechanical parts contained therein such as the pinion gear 140, the drive gear 150, and the first and second spaced bearings 134 and 136.

The front AGB wall 110 of the AGB housing 106 further has an opening with an AGB clamping interface 112 at the periphery of the opening to align with an S/G clamping interface 166 on an S/G housing 160 that can be clamped together with clamp 168 to mount the S/G 101 to the AGB 100. When the S/G 101 with S/G housing 160 defining an S/G interior 161 is mounted to the AGB 100, a first S/G housing portion 162 is disposed within the AGB interior 120 and a second S/G housing portion 164 is disposed outside of the AGB interior 120.

The S/G 101 comprises a second shaft portion 170 extending from the S/G interior 161 rotatably supported by a third spaced bearings 182, a fourth spaced bearings 188, and a fifth spaced bearings 189. The second shaft portion 170 and the first shaft portion 132 are coupled together with a slidable coupler 171, a drive coupler 172 and a shear coupler 173 to collectively form a single rotatable shaft 130 or drive shaft. For example, the slidable coupler 171 can be slidably coupled to the first shaft portion 132. The slidable coupler 171 can further be slidably coupled to the drive coupler 172. The drive coupler is further coupled to the shear coupler 173. The shear coupler 173 is further coupled to the second shaft portion 170.

The second shaft portion 170 carries multiple machines within the S/G interior 161 such as a main machine 220, an exciter 210, and a PMG 200, with the corresponding rotating component comprising a main machine rotor 222, an exciter rotor 212, and a PMG rotor 202, respectively, and the corresponding fixed component comprising a main machine stator 224, an exciter stator 214, and a PMG stator 204. The exciter 210 provides direct current to the field windings of the main machine 220. The main machine 220 and PMG 200 supply AC electrical power when the rotatable shaft 130 (e.g., drive shaft 130) rotates. The machines 200, 210, and 220 can be carried on second shaft portion 170 between the fourth spaced bearings 188 and the fifth spaced bearings 189. The fixed components 204, 214, and 224 can be mounted to any suitable part of either or both the first S/G housing portion 162 and second S/G housing portion 164.

As illustrated, the S/G 101 can be oil cooled, and an oil inlet port 230 and an oil outlet port 232 can be provided for controlling the supply of oil to and from the S/G 101. The cooling oil can be used to dissipate heat generated by the electrical and mechanical functions of the S/G 101 by flowing the oil through oil conduits 236 and 238, such that the machines 200, 210, and 220 are not coated with oil and particularly the spaces between the fixed components 204, 214, and 224 and rotating components 202, 212, and 222 are not filled with oil. Therefore, the oil that is used to cool the machines within the S/G interior 161 does not freely flow outside of designated conduits 236 and 238.

The AGB housing 106 and the S/G housing 160 can be formed by any known materials and methods, including, but not limited to, die-casting of high strength and lightweight metals such as aluminum, stainless steel, iron, or titanium. The AGB housing 106 and S/G housing 160 can be formed with a thickness that provides adequate mechanical rigidity without adding unnecessary weight to the AGB 100 and, therefore, the aircraft.

The rotatable shaft 130 comprising the first shaft portion 132, the second shaft portion 170, the slidable coupler 171 the drive coupler 172, and the shear coupler 173 can be constructed by any known materials and methods, including, but not limited to extrusion or machining of high strength metal alloys such as those containing aluminum, iron, nickel, chromium, titanium, tungsten, vanadium, or molybdenum. The diameter of the rotatable shaft 130 can be fixed or vary along the length of the rotatable shaft 130. The diameter can vary to accommodate different sizes, as well as rotor to stator spacings of the various machines 200, 210, and 220.

The machines 200, 210, and 220 are placed on the same side of the pinion gear 140 and the exciter 210 and the PMG 200 are placed closer to the pinion gear 140 than the main machine 220; however, alternative configurations can be included. The machines 200, 210, and 220 can be any combination of known motors and generators. For example, the main machine 220 could be either a synchronous or asynchronous generator. In addition to the machines shown in this aspect, there can be other components that can be operated for particular applications. For example, in addition to the electromechanical machines 200, 210, 220 shown, there can be other machines driven from the same rotatable shaft 130 such as an oil pump, a fluid compressor, or a hydraulic pump.

As described herein, either the AGB 100 or the S/G 101 can be a driving mechanism for driving the rotation of the rotatable shaft 130. For example, during starting operations, the S/G 101 can be the driving mechanism for rotation of the rotatable shaft 130. Alternatively, during some gas turbine engine operations, the AGB 100 can be the driving mechanism for rotation of the rotatable shaft 130. The non-driving mechanism, that is, the equipment being driven by the driving mechanism, can be understood as rotating equipment utilizing the rotational movement of the rotatable shaft 130, for example to generate electricity in the S/G 101.

Aspects can include a resettable disconnector system 300 (shown schematically as a dotted rectangle for clarity). The disconnector system 300 can be disposed near the slidable coupler 171. For example, the disconnector system 300 can be mechanically coupled with a wall of the S/G housing 160 proximate to the slidable coupler 171 between the S/G 101 and the AGB 100. The disconnector system 300 and/or the shear coupler 173 can be provided to operatively mechanically decouple the machines 200, 210, and 220 from the pinion gear 140 and, thereby, the drive gear 150 and the AGB 100 in the case of failure of any of the machines 200, 210, 220. Failure of any of the machines 200 can include, but is not limited to, mechanical failure or thermal failure.

While the disconnector system 300 is shown within the S/G interior 161, alternative aspects of the disclosure can include positioning the disconnector system 300 between the S/G 101 and the AGB 100, internal to the AGB 100, or positioned anywhere along a portion of the rotatable shaft 130.

Figure 3:
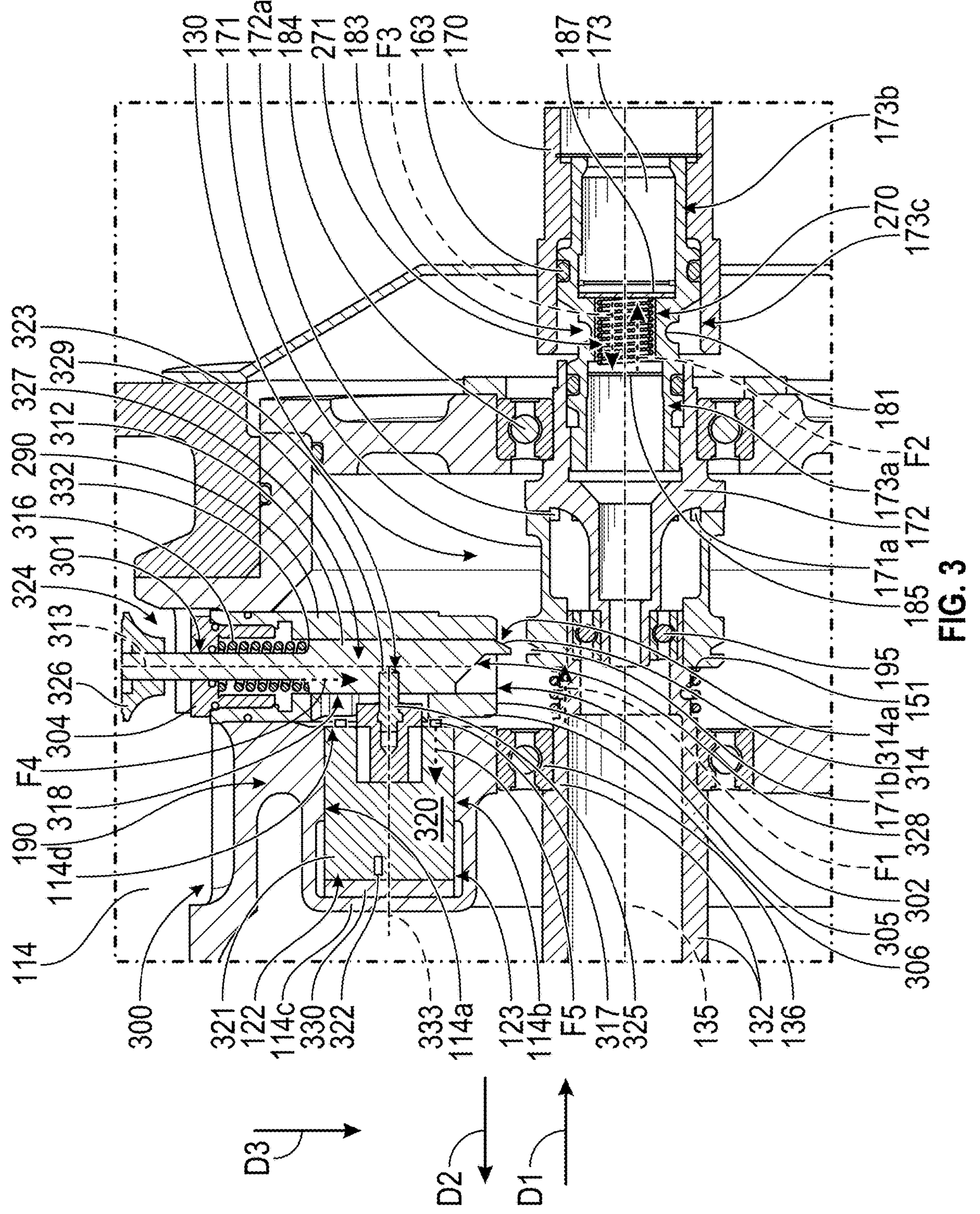
FIG. 3 is a sectional view of a disconnector system in a first operating state relative to the rotatable shaft, in accordance with various aspects described herein.

FIG. 3 is a block diagram of another non-limiting aspect of the rotatable shaft 130 depicting the disconnector system 300 in a first operating state (e.g., disengaged). The disconnector system 300 can include a disconnector mechanism 190, an actuator 320 having a moveable member 325, and a meltable element 330. As will be described in more detail herein, the disconnector mechanism 190 can be selectively operated to disconnect or rotationally de-couple the slidable coupler 171 from the drive coupler 172. The disconnector mechanism 190 can be operated by an operation of the actuator 320, and/or a movement of the actuator 320 resulting from a melting of the meltable element. In non-limiting aspects, the disconnector system 300 can further include a passive disconnector function, including the shear coupler 173 having a biasing element. As shown in FIG. 3, in the first operating state, with the meltable element 330 is intact, that is, not melted, and the shear coupler 173 is in a non-sheared or intact condition.

As shown, the rotatable shaft 130 can define a first axis of rotation 135. The drive coupler 172 is shown coupled to the shear coupler 173, with the shear coupler 173 coupled to the second shaft portion 170. The slidable coupler 171 can be slidably coupled to the first shaft portion 132, and to the drive coupler 172, respectively, by any known method of coupling including, but not limited to, splines, gears, a clutch mechanism, or combinations thereof. For example, in the illustrated aspect, the slidable coupler 171 is selectively coupled to the drive coupler 172 via engagement between a first set of teeth 171*a* extending from the slidable coupler 171 in a first direction D1, and a complimentary second set of teeth 172*a* extending from the drive coupler 172 in a second direction D2 to arrange a rotatable engagement between the slidable coupler 171, and the drive coupler 172.

It is contemplated that, in some non-limiting aspects, the drive coupler 172 and the shear coupler 173 can be formed as a unitary element, without departing from the scope of the disclosure.

In non-limiting aspects, a first biasing member 151 (e.g., a compression spring, a drive shaft biasing member 151) can be disposed between the first shaft portion 132 and the slidable coupler 171 to apply a first force F1 in the first direction D1, to bias the slidable coupler 171 in the first direction D1 and into engagement with the drive coupler 172. The drive coupler 172 can be rotatably supported at a first end by the fourth spaced bearings 188, and rotatably supported at a second end by a sixth spaced bearing 195. For example, the sixth spaced bearing 195 can be supportably retained within the first shaft portion 132, and the drive coupler 172 can extend into the first shaft portion 132 and rotatably supported by the sixth spaced bearing 186.

The shear coupler 173 can be rotatably coupled to the drive coupler 172, and to the second shaft portion 170, respectively, by any known method of coupling including, but not limited to, splines, gears, teeth, a clutch mechanism, or combinations thereof. In some examples, a lubrication system for a spline connection and generator bearing of a high speed generator which can use a split ring seal and quad o-ring. The split ring seal can retards lubricant flow so that there is an accumulation in the area of the splined connection which prevents wear of the splines. A set of oil seals 163 can circumferentially surround the shear coupler 173, and can be circumferentially surrounded by the drive coupler 172 and the second shaft portion 170, respectively.

The shear coupler 173 can include a first end 173*a* and an opposing second end 173*b* with an intermediate section 173*c* extending therebetween. The intermediate section 173*c* can define a cavity 270 therein. The cavity 270 can extend between a radially-extending first wall 185 and a radially-extending second wall 187 within the shear coupler 173. The first wall 185 can be proximal the first end 173*a*, and the second wall 187 can be proximal the second end 173*b*, with the first wall 185 axially spaced from the second wall 187. A second biasing member 271 (e.g., a compression spring, a shear coupler biasing member 271) can be disposed in the cavity 270. The second biasing member 271 can extend between the first wall 185 and the second wall 187. The second biasing member 271 can be arranged to provide a second force F2 against the first wall 185 in the second direction D2 (e.g., leftward when looking at the page) and an opposing third force F3 against the second wall 187 in the first direction D1 (e.g., rightward when looking at the page). The intermediate section 173*c* can include an annular shear portion 183. For example, the shear portion 183 can define a necked down region 181 (e.g., a "weak point") configured to shear at a predetermined torque threshold. The shear portion 183 is and provide a controlled or predetermined region for failure of the shear coupler 173 at the necked down region 181, in response to torsional overload on the rotatable shaft 130. The shear portion 183 can represent a first sheared portion and a second sheared portion. The sheared coupler is configured to shear at a predetermined torque threshold to define the first sheared portion and the second sheared portion. The sheared coupled biasing member can be disposed in the cavity 270 and arranged to further separate the first sheared portion and the second sheared portion.

The necked down region 181 can be configured to define a region of torsional failure (e.g. a shear) for the shear coupler 173. The torsional failure or shear can be arranged to occur at a predetermined torque threshold level. The necked down region 181 can be formed in the intermediate section 173*c*, for example by grinding or any other desired method. The necked down region 181 can be disposed axially between the first wall 185 and the second wall 187 and extend circumferentially around the intermediate section 173*c*.

The predetermined torque threshold level can be selected based upon a predetermined overload limit for the rotatable shaft 130. In this way, the shear portion 183 can be arranged to be the point of failure during a torsional overload event, and the necked-down region 184 can be configured to have a lower torque threshold level than each of the first shaft portion 132, the second shaft portion 170, the slidable coupler 171, and the drive coupler 172, while still otherwise being able to transmit normal torque loads (e.g., below the torque threshold level) through the rotatable shaft 130. Because the shear stress ($\tau$) is influenced by the cross-sectional area of the intermediate section 173*c* (represented by the relationship $\tau$=F/A where F=the force applied, and A=the cross-sectional area of the necked down region 184), the torque threshold level can be adapted or modified by, for example, varying the cross-sectional area of necked-down region 184.

In operation, and in the event of a torsional overload (e.g., a torque level exceeding the predetermined torque threshold level of the necked-down region 184) the intermediate section 173c will shear along the necked down region 184, severing the intermediate section 173c such that the first end 173a is axially disconnected from the second end 173b, with the first end 173a and the second end 173b defining respective first and second severed portions. In such a case, the second shaft portion 170 is rotationally disconnected from first end 173a of the shear coupler 173 such that the two are no longer rotationally connected, and the first shaft portion 132 is rotationally disconnected from the second end 173b of the shear coupler 173 such that the two are no longer rotationally connected. This intentional severing or shearing of the intermediate section 173c responsive to a torsional overload can reduce or prevent damage to the S/G 101 and/or the AGB 100 (FIG. 2).

Although the shearing at the necked down region 184 due to a torsional overload event can axially disconnect or de-couple the first end 173a from the second end 173b, the first end 173a and the second end 173b may still otherwise remain in close enough proximity to rub together while the first end 173a and the second end 173b continue to rotate (e.g., due to inertia). This can cause damage to the rotatable shaft 130, as well as create sparks or other debris from metal-on-metal contact. However, in the event of a shear along the necked down region 184, (e.g., due to a torsional overload event), the second biasing member 271 can prevent such secondary damage to the rotatable shaft 130 by immediately biasing an axial separation of the first end 173a from the second end 173b. For example, the second biasing member 271 can comprise a compression spring arranged to provide the second force F2 against the first wall 185 and the opposing third force F3 against the second wall 187. With such an arrangement, in the event of a shear of shear coupler 173 between the first wall 185 and the second wall 187 (e.g., at the necked down region 184) the second biasing member 271 can further bias the axial separation of the first end 173a from the second end 173b. In this way, during a torsional overload event, the second biasing member 271 biases a separation of sheared to prevent damage to the rotatable shaft 130.

With continued reference to FIG. 3, the disconnector mechanism 190 can be selectively operated to disconnect or rotationally de-couple the slidable coupler 171 from the drive coupler 172. The disconnector mechanism 190 can be operated by an operation of the actuator 320, and/or a movement or displacement of the actuator 320 resulting from a melting of the meltable element.

The disconnector mechanism 190 can include a casing 290, a disconnector shaft 312, a camming tool 314, a third biasing element 316 (e.g., a disconnector biasing element), illustrated as a compression spring, and a shaft handle 326. The casing 290 can include a top wall 304, and opposing bottom wall 305 spaced therefrom, and a side wall 306 arranged between the top wall 304 and bottom wall 305. The top wall 304 can define a first opening 301 therethrough, and the bottom wall 305 can define a second opening 302 therethrough. The casing 290 can define an interior channel 318 extending from the first opening 301 to the second opening 302. A third opening 303 can be defined through the side wall 306 in fluid communication with the channel 318.

In non-limiting aspects, the casing 290 can include a set of mounting apertures (not shown) arranged to receive a mechanical fastener, such as a screw. In this sense, the set of mounting apertures allow for mounting the casing 290 of the disconnector mechanism 190 within at least one of the S/G 101, the AGB 100 (FIG. 2), or any position proximate to the rotatable shaft 130.

The disconnector shaft 312 can include a first end 324 and an opposing second end 328, distal from the first end 324. An elongated intermediate shaft portion 327 can define a longitudinal major body second axis 313 extending between the first end 324 and the second end 328. The second axis 313 can be arranged orthogonal to the first axis of rotation 135. The disconnector shaft is at least partially disposed in the casing 290. For example, the disconnector shaft 312 can be slidably disposed within the channel 318 and can extend through the first opening 301 at the first end 324, and can extend through the second opening 302 at the second end 328. The disconnector shaft 312 can include the shaft handle 326 at the first end 324, and the camming tool 314 at the second end 328.

The intermediate shaft portion 327 can include a moveable member engagement surface 329. In non-limiting aspects, the moveable member engagement surface 329 can define a recess 323 on the intermediate shaft portion 327. The recess 323 can be sized to receive a distal end of the moveable member 325 therein. The intermediate shaft portion 327 can further include a shoulder 332 defined thereon. The third biasing element 316 (e.g., a disconnector biasing element) can be arranged between the shoulder 332 and the casing 290 and arranged to apply a fourth force F4 to the disconnector shaft 312 to bias the disconnector shaft 312 toward a third direction D3 (e.g., downward when looking at the page) toward the slidable coupler 171. In non-limiting aspects the third direction D3 can be orthogonal to the second direction D2. The disconnector shaft 312 is moveable with respect to the casing 290 along the second axis 313 between a first position (e.g. disengaged or radially spaced from the slidable coupler 171) and a second position (e.g. engaged with the slidable coupler 171). For example, when the disconnector shaft 312 is in the first position, the camming tool 314 can be spaced from the slidable coupler 171, and when the disconnector shaft 312 is in the second position, the camming tool 314 can engage the slidable coupler 171.

The camming tool 314 can be a tool selected, configured, shaped, or arranged to operatively engage a complementary mating surface 171b of the slidable coupler 171. In the illustrated aspect, the camming tool 314 can define a cam surface 314a. The cam surface 314a can be oriented at a non-zero angle to the second axis 313. As shown, the camming tool 314 can be formed or defined as a unitary extension of the second end 328 of the disconnector shaft 312. In other aspects, the camming tool 314 can be mounted or fastened to the second end 328 of the disconnector shaft 312, for example by way of a mechanical fastener (not shown), such as a screw.

The cam surface 314a and the complementary mating surface 171b are oriented with respect to each other such that a slidable engagement between the cam surface 314a and the complementary mating surface 171b of the slidable coupler 171 results in an axial movement of the slidable coupler 171 in the second direction D2, and away from the drive coupler 172, thereby decoupling the slidable coupler 171 from the drive coupler 172.

The actuator 320 can include an actuator body 321, and an input terminal 322. For example, in non-limiting aspects, the actuator 320 having a moveable member 325 can comprise a conventional electrical solenoid having an armature.). While aspects of the actuator 320 are described herein for ease of description and understanding as being an electrical solenoid having a rectilinearly moveable member 325, other aspects are not so limited. In various aspects it is contemplated that the actuator 320 can be operated using other power sources, including without limitation hydraulic, pneumatic, magnetic, electronic, or manual, and combinations thereof, and the moveable member can be configured for movement as desired (e.g., a rotational movement).

The actuator 320 can be positioned proximal to the disconnector shaft 312. In non-limiting aspects, the back wall 114 of the AGB housing 106 can further define a first inset cavity 122 and a second inset cavity 123 fluidly coupled to the first inset cavity 122. For example, the back wall 114 can include a first surface 114*a* spaced from an opposing second surface 114*b*, and a third surface 114*c* coupling the first surface 114*a* and second surface 114*b*. The first inset cavity 122 can be cooperatively defined by the first, second, and third surfaces 114*a*, 114*b*, 114*c*. The back wall 114 can further define a first inset cavity opening 114*d* opposingly facing the third surface 114*c* and proximal the disconnector mechanism 190. The first inset cavity 122 is sized to accommodate the actuator 320 therein. At least one fourth biasing member 317 (e.g., at least one compression spring, actuator biasing member) can be disposed between the actuator body 321 and the casing 290. The fourth biasing member (e.g., actuator biasing member) 317 can be arranged to apply a fifth force F5 against the actuator body 321 in the second direction D2 (e.g., leftward when looking at the page) to bias the actuator 320 into the first inset cavity 122. The first inset cavity 122 is further sized to accommodate the meltable element 330 therein. For example, the meltable element 330 can be positioned within the first inset cavity 122 thermally coupled, that is, in thermal communication, with the with the third surface 114*c*, and between the third surface 114*c* and the actuator body 321 to obstruct or prevent a movement of the actuator 320 in the second direction D2.

The meltable element 330 can comprise a material selected or configured to remain in a solid state while exposed to temperatures common to a normal operation of the S/G 101 or AGB 100 (FIG. 2). The meltable element 330 can further comprise a material selected or configured to melt at a threshold temperature indicative of a selected, indicated, or predetermined failure of the S/G 101 or AGB 100. In one non-limiting aspect, the meltable element 330 can comprise solder, or solder-like material containing tin, lead, indium, copper, silver, or combinations thereof, and be selected or configured to melt at or above temperatures of 180 degrees Celsius. In additional non-limiting examples, the meltable element 330 can comprise $Sn_{96.5}Ag_{3.5}$, which melts at 221 degrees Celsius. In yet another non-limiting example, the meltable element 310 can comprise a composition or material that melts between 180 and 315 degrees Celsius.

As illustrated in FIG. 3, the moveable member 325 can be arranged in a third position (e.g., an extended position). As such, when the meltable element 330 is disposed in the first inset cavity 122 between the actuator body 321 and the third surface 114*c*, and the moveable member 325 is in the third position, and the disconnector shaft 312 is in the first position, a distal end of the moveable member 325 can protrude from the actuator body 321 to engage the moveable member engagement surface 329 on disconnector shaft 312. For example, the distal end of the moveable member 325 can be received in the recess 323. When so arranged, the moveable member 325 can restrain the disconnector shaft 312 in the first position against the bias of the fourth force F4 from the third biasing element 316. In this way, the moveable member 325, can prevent a movement of the disconnector shaft 312 from the first position to the second position.

Responsive to an input (e.g. a voltage signal) at the input terminal 322, the moveable member 325 can be selectively moved along a third axis 333 relative to the actuator body 321 in the second direction D2 to a fourth position (e.g., a retracted position).

When the moveable member 325 is in the fourth position (FIG. 5), the distal end of the moveable member 325 is dis-engaged from the moveable member engagement surface 329 of the intermediate shaft portion 327 to release the disconnector shaft 312 from the first position responsive to the bias of the first biasing element. In this way, the moveable member 325, when in the fourth position, can allow a movement of the disconnector shaft 312 in the third direction D3, from the first position to the second position.

Figure 4:
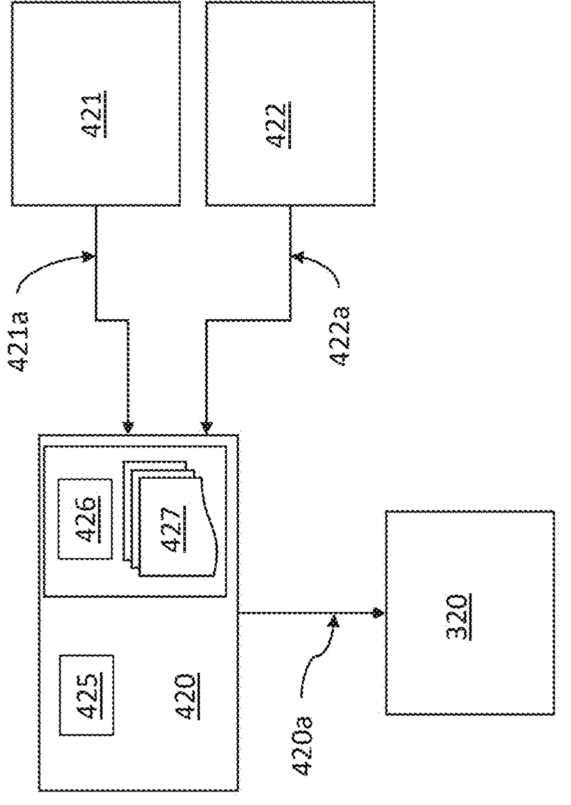
FIG. 4 is a block diagram of a control system for the disconnector system of FIG. 3, in accordance with various aspects described herein.

In non-limiting aspects, the disconnector system 300 can include a control system 400. FIG. 4 depicts a block diagram of a non-limiting aspect of the control system 400 communicatively coupled to the actuator 320.

The control system 400 can include a set of sensors 422 and/or a user interface device 421. In some aspects, the control system 400 can include a controller module 420. In such aspects, the controller module 420 can be communicatively coupled to at least one of the set of sensors 422 and the user interface device 421. The controller module 420 is communicatively coupled to the actuator 320 to control an operation thereof. The controller module 420 can include a processor 425 or other logic device communicatively coupled to a memory 426.

The user interface device 421 can be disposed on the AGB 100 or S/G 101 (FIG. 1). In some aspects, the user interface 421 can be disposed at any desired location, or combination of locations, on or remote from the AGB 100 or S/G 101, including, without limitation, on a remote or mobile device (not shown), and communicatively coupled to the disconnector system 300, such as in the cockpit of an aircraft (not shown). The user interface device 421 can include, for example, a knob, button, electronic interface such as a touch screen, keyboard, and the like to enable a user to manually trigger a first signal 421*a* such as an interface signal to the controller module 420.

In non-limiting aspects, the set of sensors 422 can be disposed on or within the AGB 100 or S/G 101, or both, or in any other desired location without departing from the scope of the disclosure herein. The set of sensors 422 can configured to sense, detect, measure, or otherwise determine a value of a respective parameter. For example, in non-limiting aspects, the respective parameter can include a temperature, a pressure, a rotational velocity, and the like. The sensors 422 can comprise any desired conventional sensor including, but not limited to a temperature sensor, a pressure sensor, a vibration sensor, a proximity sensor, a voltage sensor, a current sensor, an airflow sensor, a switch sensor, or combinations thereof. The sensors 422 can be arranged to provide a respective second signal 422*a* such as a sensor signal indicative of a value of the respective parameter to the controller module 420. For example, the value of the respective parameter can be indicative of a status of the AGB 100 or S/G 101, or both.

In non-limiting aspects, the controller module 420 can be disposed on or within the AGB 100 or S/G 101, or both, or in any other desired location without departing from the scope of the disclosure herein. It is contemplated that the controller module 420 can be configured for wireless communication with the user interface device 421, the set of sensors 422, or the actuator 320, and combinations thereof, and can be disposed remote from the AGB 100 or S/G 101 without departing from the scope of the disclosure. The controller module 420 can be coupled in signal communication with the user interface device 421 to receive the first signal 421*a* therefrom. The controller module 420 can alternatively or additionally receive the second signal 422*a* from the set of sensors 422.

The memory 426 can be configured to store a set of threshold values 427. The set of threshold values 427 can include predetermined threshold values 427 associated with or corresponding to a predetermined condition or status of the AGB 100 or S/G 101, the rotatable shaft 130, or combinations thereof. For example, the set of threshold values 427 can be indicative of various target or desired parameters such as temperature (e.g., a bearing temperature), pressure (e.g., an oil pressure), speed (e.g., a rotational velocity of the rotational shaft 130, and the like. Additionally, or alternatively, the set of threshold values 427 can include calculated threshold values 427 associated with or corresponding to a predetermined failure conditions (e.g., a temperature) of the AGB 100 or S/G 101, the rotatable shaft 130, or combinations thereof. For example, in non-limiting aspects, the processor can be configured to calculate, estimate, or otherwise determine the set of threshold values 427 in real-time. In non-limiting aspects, the threshold values 427 can be selectable by the controller module 420 from the memory 426, or calculated, estimated, or otherwise determined by the processor 425, or both, based on the first signal 421*a*, or values of respective parameters received from the set of sensors 422, or combinations thereof.

The controller module 420 can be configured to selectively activate or energize the actuator 320 to trigger an operation thereof. The selective activation or can be based on, the first signal 421*a* from the user interface device 421 and/or alternatively the second signal 422*a* received from one or more sensors 422. In some examples, the controller module 420 is configured to determine the value of a sensed parameter based at least in part on a respective sensor signal, and the sensed parameter is compared to the determined value with a threshold value. When the determined value satisfies the threshold value, the controller module 420 provides the actuation signal to the actuator to trigger the operation of the actuator.

In operation, the controller module 420 can provide an actuation signal 420*a* to the actuator 320 based on a receipt of the first signal 421*a*. Additionally or alternatively, the controller module 420 can be configured to determine the value of the respective parameter based on a received second signal 422*a*. For example, the controller module 420 can compare the determined value of the respective parameter to a respective threshold value 427 stored in the memory 426. When the determined value of the respective parameter satisfies the threshold value 427, the controller module 420 can provide the actuation signal 420*a* to the actuator 320.

For example, in one non-limiting instance, in the event that during operation of the AGB 100 or the S/G 101, heat generated by the respective assemblies 100, 101 sensed by the set of sensors 422 is determined by the controller module 420 to satisfy a threshold value 427, the controller module 420 provides the actuation signal 420*a* to trigger an operation of the actuator 320 to drive a movement of the moveable member 325 and transition the disconnector system 300 from the first operating state (shown in FIG. 3) to the second operating state.

Figure 5:
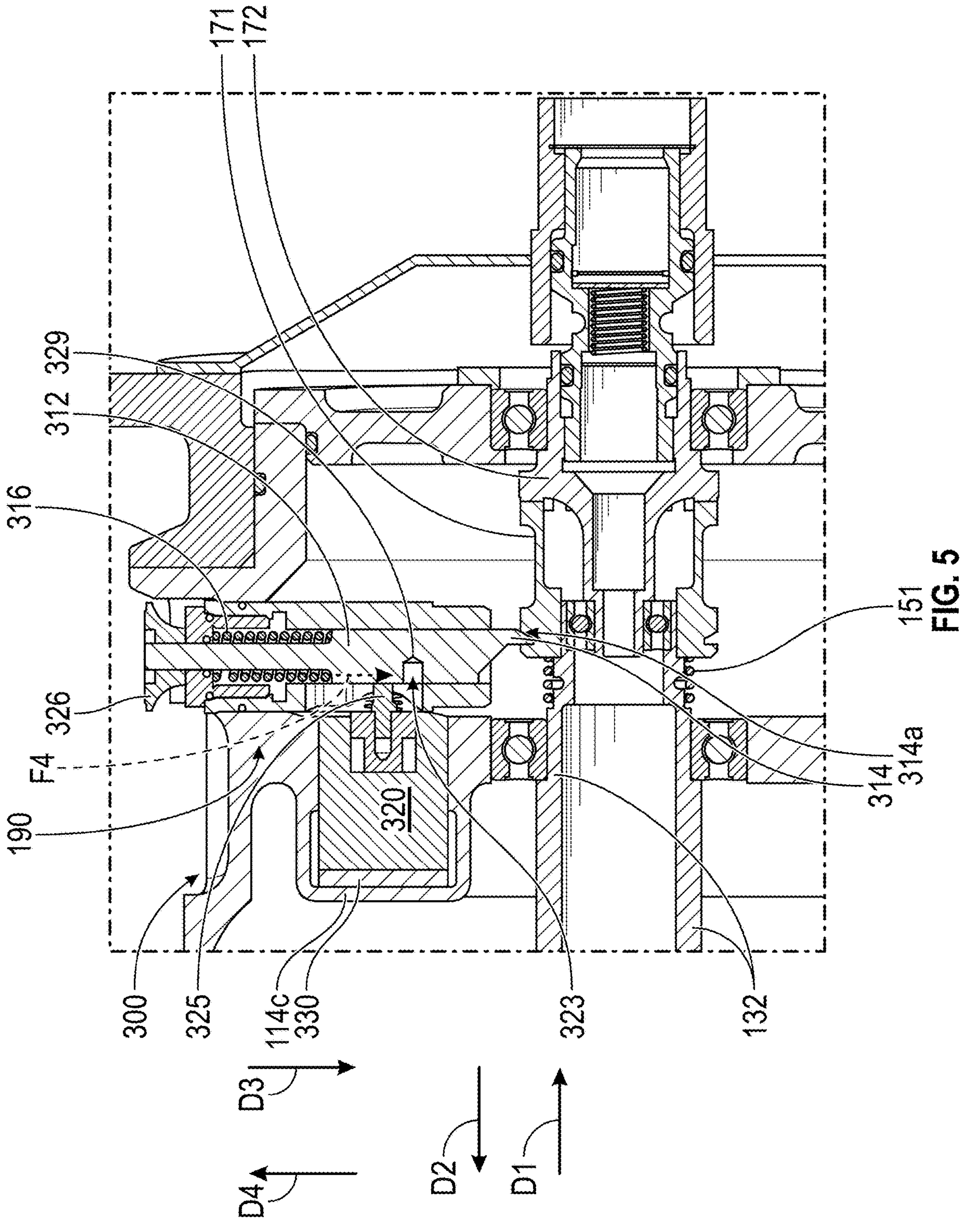
FIG. 5 is a sectional view of an instance of the disconnector of FIG. 3 in a second operating state relative to the rotatable shaft, in accordance with various aspects described herein.

FIG. 5 depicts a block diagram of the rotatable shaft 130 of FIG. 3, depicting the disconnector system 300 in a second operating state (e.g., engaged), in an instance wherein an operation of the actuator 320 has been triggered (e.g., by the control module 420), with the meltable element 330 intact, and the shear coupler 173 in a non-sheared or intact condition.

One notable difference from FIG. 3 is that FIG. 5 depicts the moveable member 325 in the fourth position (e.g., retracted) with respect to the actuator 320 such that the distal end of the moveable member 325 is disengaged from the moveable member engagement surface 329 of the intermediate shaft portion 327. Another difference is that FIG. 5 depicts the disconnector shaft 312 in the second position, and the slidable coupler 171 decoupled from the drive coupler 172.

In operation, responsive to the actuation signal 420*a* from the controller module 420, the actuator 320 can operate to drive a movement of the moveable member 325 in the second direction D2 from the third position to the fourth position. As illustrated, when the moveable member 325 is in the fourth position, the distal end of the moveable member 325 is released from engagement with the moveable member engagement surface 329 on the intermediate shaft portion 327, thereby allowing the disconnector shaft 312 to move with respect to the casing 290, responsive to the fourth force F4 exerted by the third biasing element 316, in the third direction D3 to the second position.

When the disconnector shaft 312 is moved from the first position (FIG. 3) to the second position (FIG. 5), the cam surface 314*a* of the camming tool 314 engages the complementary mating surface 171*b* of the slidable coupler 171, exerting a net fifth force F5 in the second direction D2 on the slidable coupler 171 that opposes and overcomes the first force F1 exerted by the first biasing member 151 (e.g., drive shaft biasing member 151) on the slidable coupler 171. The fifth force F5 in the second direction D2 applied to the slidable coupler 171 results in a movement of the slidable coupler 171 in the second direction D2 thereby disengaging or decoupling the slidable coupler 171 from the drive coupler 172.

If desired, the disconnector shaft 312 can subsequently be reset to from the second position (FIG. 5) to the first position (FIG. 3), for example by manually pulling the shaft handle 326 in a fourth direction D4 (e.g., upward when looking at the page) opposite to the third direction D3, until the moveable member 325 engages the moveable member engagement surface 329, thereby retaining the disconnector shaft 312 in the first position. The movement of the disconnector shaft 312 in the fourth direction D4 additionally disengages the cam surface 314*a* of the camming tool 314 from the complementary mating surface 171*b* of the slidable coupler 171, thereby enabling the slidable coupler 171 to move in the first direction D1, responsive to the first force F1 exerted by the first biasing member 151 to engage the drive coupler 172.

During operation of the AGB 100 or the S/G 101, heat generated by the respective assemblies 100, 101 can be thermally conducted by way of any intervening walls or structures (e.g., the back wall 114) to the meltable element 330. During normal AGB 100 or S/G 101 operations, the heat generated by the respective assemblies 100, 101 are insufficient to melt the meltable element 330. In this sense, during normal AGB 100 or S/G 101 operations, the disconnector system 300 can remain in a first operating state (e.g., disengaged), the meltable element remains intact, the actuator 320 is prevented from moving in the second direction D2 by the meltable element 330, and the moveable member 325 remains engaged with the moveable member engagement surface 329 thereby retaining the disconnector shaft 312 in the first position (FIG. 3) such that the cam surface 314*a* is prevented from contacting the slidable coupler 171.

However, during an AGB 100 or S/G 101 failure, such as a bearing failure of the respective assembly 100, 101, the operating temperature of the failed assembly 100, 101 can rise to a higher temperature compared with the aforementioned normal operation. The increase in heat generated by the failed assembly 100, 101 will in turn, conduct more heat to the meltable element 330, by way of any intervening walls or structures (e.g. the back wall 114). As explained above, the meltable element 330 can be selected or configured to melt at a threshold temperature, or a predetermined threshold temperature, indicative of a failure of the respective failed assembly 100, 101. In this sense, the failure of the respective assembly 100, 101 causes the meltable element 330 to melt.

Figure 6:
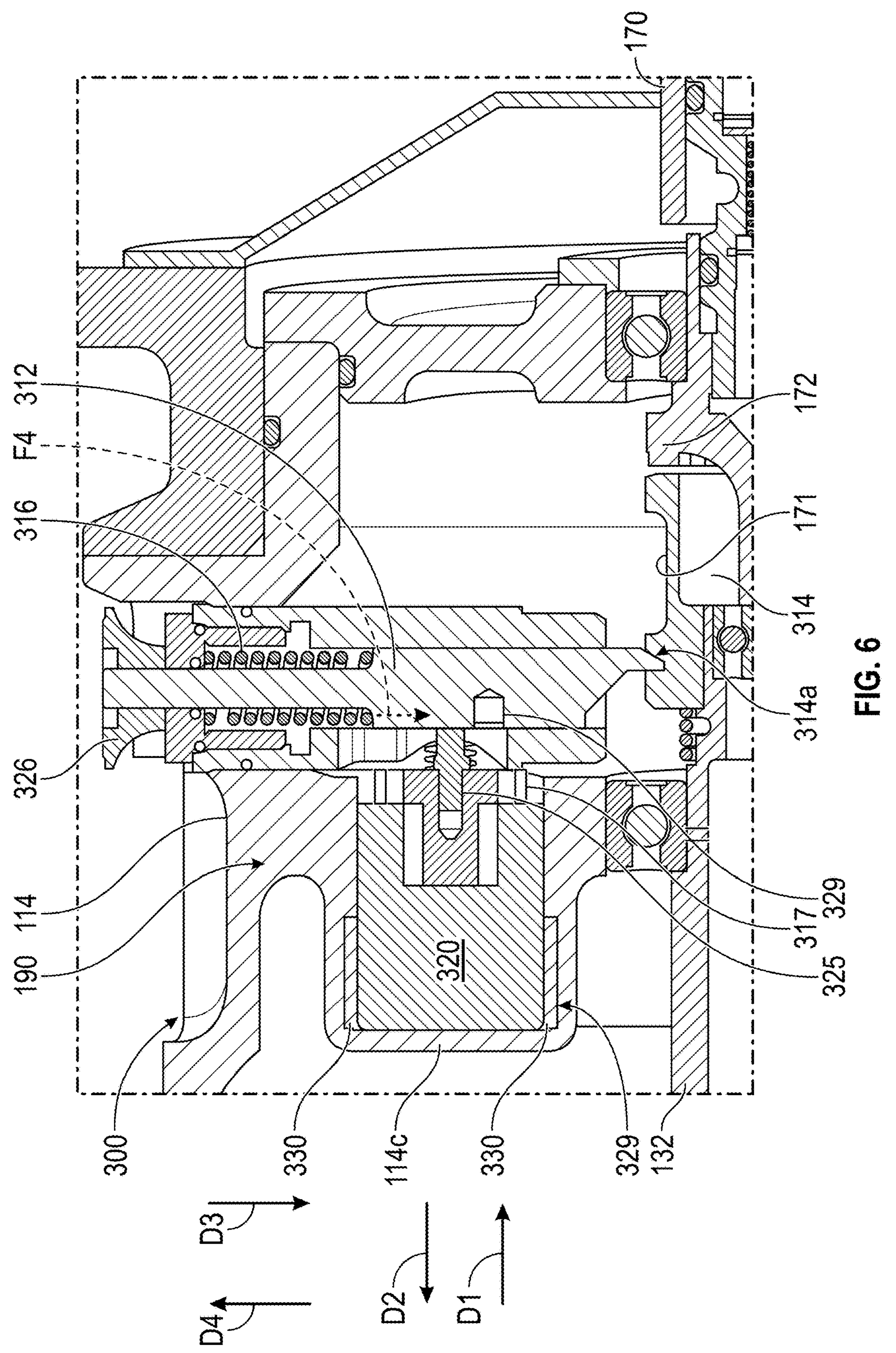
FIG. 6 is a sectional view of another instance of disconnector of FIG. 3 in the second operating state relative to the rotatable shaft, in accordance with various aspects described herein.

FIG. 6 depicts a block diagram of the rotatable shaft 130 depicting the disconnector system 300 of FIG. 3 in the second operating state (e.g., engaged), wherein the failure of at least one of the AGB 100 or S/G 101 has generated sufficient heat to melt the meltable element 330.

It will be appreciated that both FIGS. 5 and 6 depict the disconnector system 300 in the second operating state (e.g., engaged). However, FIG. 5 depicts an instance wherein the disconnector system 300 transitioned to the second operating state via an operation of the actuator 320 to trigger a movement of the moveable member 325 (e.g., without a displacement of the actuator body 321), while FIG. 6 depicts an instance where the disconnector system 300 transitioned to the second operating state via a displacement or movement of the actuator 320 (e.g., without an operation of the actuator 320 to trigger an independent movement of the moveable member 325).

In operation, as the meltable element 330 melts, at least a portion of the meltable element 330 can flow into the second inset cavity 123 and be flowably received therein, such that the meltable element 330 is no longer positioned between the third surface 114*c* and the actuator body 321 and no longer obstructing or preventing a movement of the actuator 320 in the second direction D2. In such an instance, the actuator 320, responsive to the fifth force F5 exerted on the actuator body 321 by the at least one fourth biasing member 317 can move in the second direction D2 further into the first inset cavity 122. Such a movement of the actuator 320 in the second direction D2 can move the moveable member 325 out of engagement with the moveable member engagement surface 329 (e.g., without operating the actuator 320) such that the disconnector shaft 312 is no longer retained or restrained in the first position thereby allowing the disconnector shaft 312 to move with respect to the casing 290, responsive to the fourth force F4 exerted by the third biasing element 316, in the third direction D3 to the second position.

When the disconnector shaft 312 is moved from the first position (FIG. 3) to the second position (FIG. 6), the cam surface 314*a* of the camming tool 314 engages the complementary mating surface 171*b* of the slidable coupler 171, exerting a net fifth force F5 in the second direction D2 on the slidable coupler 171 that opposes and overcomes the first force F1 exerted by the first biasing member 151 on the slidable coupler 171. The fifth force F5 in the second direction D2 applied to the slidable coupler 171 results in a movement of the slidable coupler 171 in the second direction D2 thereby disengaging or decoupling the slidable coupler 171 from the drive coupler 172.

In non-limiting aspects, the disconnector system 300 can be reset after a melting of the meltable element 330, for instance, after causing a decoupling the slidable coupler 171 from the drive coupler 172 by replacing the meltable element 330 and reinstalling the actuator 320 into the first inset cavity 122, and arranging the disconnector shaft 312 in the first position.

Aspects of the disclosure can include configurations wherein the disconnector system 300 can be resettable. For instance, after causing a predetermined failure in the rotatable shaft 130, the disconnector system 300 can be “reset” by replacing the meltable element 330 (if needed), and/or reassembling the disconnector mechanism 190 to the first position, and/or restoring the moveable member 325 to the third position.

In various aspects, as disclosed herein, the disconnector system 300 can be arranged to provide an integrated system providing three independent functions arranged to disconnect a drive shaft of a drive mechanism from rotating equipment upon a failure of the drive mechanism or rotating equipment. In this way, redundant operation of the system elements can be provided increased reliability in operation. For example, the disconnector system 300 can be arranged, to provide a primary disconnect operation, such that the controller module 420 can trigger an operation of the actuator 320 based on a sensed temperature that satisfies a threshold value 427 associated with a predetermined failure condition (e.g., an increased temperature due to a torsional overload) of the AGB 100 or S/G 101, the rotatable shaft 130, or combinations thereof. In the event that the actuator 320 unexpectedly does not operate properly, the shear coupler 173 can be arranged to provide a secondary (e.g., a back-up) disconnect operation responsive to the torsional overload event. Further, in the event of a malfunction in which actuator 320 does not operate properly, and the shear shaft fails to shear, the disconnector system 300 can still provide a tertiary disconnect operation as the temperature of the AGB 100 or S/G 101, the rotatable shaft 130, increases above a melting temperature of the meltable element 330.

In another examples, the disconnector system 300 can be can be arranged to provide an integrated system providing three independent functions arranged to disconnect a drive shaft of a drive mechanism from rotating equipment upon a failure of the drive mechanism or rotating equipment. In this way, redundant operation of the system elements can be provided increased reliability in operation. For example, the disconnector system 300 can be arranged, to provide a primary disconnect operation, such that the controller module 420 can trigger an operation of the actuator 320 based at least in part on an active disconnect function. The active disconnection can comprise electromechanical, electromagnetic, hydraulic, or pneumatic components which are activated by a switch. The active disconnection function can be reset or is resettable. In the event that the active disconnect function does not operate properly, a secondary disconnect operation, such that the controller module 420 can trigger an operation of the actuator 320 based on a sensed temperature that satisfies a threshold value 427 associated with a predetermined failure condition (e.g., an increased temperature due to a torsional overload) of the AGB 100 or S/G 101, the rotatable shaft 130, or combinations thereof. In the event that the actuator 320 unexpectedly does not operate properly, the shear coupler 173 can be arranged to provide a tertiary disconnect operation responsive to the torsional overload event. For example, the tertiary disconnect operation can be trigger in a generator input shaft coupling that shears at a predetermined torque threshold. As such, the disconnector system 300 can have one or more back up disconnect operations for improving reliability in the event of one or more failure events.

Many other possible aspects and configurations in addition to that shown in the above figures are contemplated by the present disclosure. Additionally, the design and placement of the various components such as S/G, AGB, or components thereof can be rearranged such that a number of different in-line configurations could be realized.

While the present disclosure has been described with reference to one or more exemplary aspects, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure is not limited to the particular aspect(s) disclosed as the best mode contemplated for carrying out this disclosure, but that the disclosure will include the aspects falling within the scope of the appended claims.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, the terms “first,” “second,” “third,” etc. may be used interchangeably to distinguish one component from another and are not intended to signify location or importance of the individual components. The terms “coupled,” “fixed,” “extended from,” “attached to,” and the like refer to both direct coupling, fixing, or attaching, as well as indirect coupling, fixing, or attaching through one or more intermediate components or features, unless otherwise specified herein.

Approximating language, as used herein throughout the specification and claims, may be applied to modify any quantitative representation that could permissibly vary without resulting in a change in the basic function to which it is related. Accordingly, a value modified by a term or terms, such as “about,” “approximately,” “proximate,” “almost,” “near” and “substantially” are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, one or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

It is to be understood that the specific devices and processes illustrated in the attached drawings and described in the following specification are simply exemplary non-limiting aspects of the disclosure herein. Hence, specific dimensions and other physical characteristics relating to the aspects disclosed herein are not to be considered as limiting, unless the appended claims expressly state otherwise.

In describing aspects illustrated in the drawings, specific terminology will be resorted to for the sake of clarity. However, it is not intended that the aspects be limited to the specific terms so selected and it is to be understood that each specific term includes all technical equivalents that operate in a similar manner to accomplish a similar purpose. For example, the words “connected,” “attached,” “coupled,” “engaged”, and “mounted” and variations thereof herein are used broadly and encompass direct and indirect connections, attachments, couplings, engagements, and mountings. In addition, the terms “connected,” “coupled,” etc. and variations thereof are not restricted to physical or mechanical connections, couplings, etc. as all such types of connections should be recognized as being equivalent by those skilled in the art.

As used herein, the term “set” or a “set” of elements can be any non-zero number of elements, including only one. The exemplary drawings are for purposes of illustration only and the dimensions, positions, order and relative sizes reflected in the drawings attached hereto can vary.

Additionally, as used herein, a “processor”, or “controller” or “controller module” can include a component configured or adapted to provide instruction, control, operation, or any form of communication for operable components to affect the operation thereof. A processor or controller module can include any known processor, microcontroller, or logic device, including, but not limited to: Field Programmable Gate Arrays (FPGA), an Application Specific Integrated circuit (ASIC), a Proportional controller (P), a Proportional Integral controller (PI), a Proportional Derivative controller (PD), a Proportional Integral Derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While “program code” is described, non-limiting examples of operable or executable instruction sets can include routines, programs, objects, components, data structures, algorithms, etc., that have the technical effect of performing particular tasks or implement particular abstract data types. In another non-limiting example, a processor or controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used herein, the term "satisfies" or "satisfaction" of the comparison is used herein to mean that the first value satisfies the second value, such as being equal to or less than the second value, or being within a predetermined value range of the second value. It will be understood that such a determination may easily be altered to be satisfied by a positive/negative comparison or a true/false comparison. Example comparisons can include comparing a sensed or measured value to a threshold value or threshold value range.

As used herein, the term "actuator" refers to a component of a machine that produces force, torque, or displacement, in a controlled way, when an electrical, pneumatic or hydraulic input is supplied to it in a system. An actuator converts such an input signal into the form of mechanical energy. For example, an actuator can be a type of transducer or solenoid.

The exemplary drawings are for purposes of illustration only and the dimensions, positions, order and relative sizes reflected in the drawings attached hereto can vary. Furthermore, the number of, and placement of, the various components depicted in the Figures are also non-limiting examples of aspects associated with the disclosure. For example, while various components have been illustrated with relative position of etc., aspects of the disclosure are not so limited, and the components are not so limited based on their schematic depictions.

In addition to the foregoing, the various approaches of the present disclosure include, but are not limited to, the approaches set forth in the following clauses.

A disconnector system for disconnecting a drive shaft of a drive mechanism from rotating equipment, the drive shaft including a first shaft portion, a slidable coupler rotatably engaged with a drive coupler, and a second shaft portion, the drive mechanism including a housing, the disconnector system comprising: a disconnector mechanism including: a casing, a disconnector shaft partially disposed within the casing, the disconnector shaft moveable relative to the casing between a first position and a second position, the disconnector shaft having a first end defining a cam surface, an opposing second end, and an intermediate shaft portion extending between the first end and the second end, the intermediate shaft portion having an engagement surface; a disconnector biasing element disposed between the casing and the disconnector shaft and arranged to bias the disconnector shaft toward the second position; an actuator having a body and a moveable member, the moveable member selectively moveable between a third position and a fourth position, the moveable member being engaged with the engagement surface when in the third position to restrain the disconnector shaft in the first position against the bias of the first biasing element, the moveable member being disengaged from the engagement surface when in the fourth position; and a meltable element disposed between the housing and the actuator body, the meltable element being in thermal communication with the housing and positioned to prevent a movement of the actuator away from the disconnector mechanism; wherein, when the disconnector shaft is in the first position, the cam surface is radially spaced from the slidable coupler of the drive shaft, and wherein, when the disconnector shaft is in the second position, the cam surface engages the slidable coupler to cause a movement of the slidable coupler to rotatably disengage the slidable coupler from the drive coupler.

The disconnector system according to any preceding clause, wherein an operation of the actuator allows the moveable member to move from the third position to the fourth position.

The disconnector system according to any preceding clause, wherein the meltable element is configured to melt at a threshold temperature indicative of a failure in the at least one of the drive mechanism or the rotating equipment.

The disconnector system according to any preceding clause, wherein a melting of the meltable element will cause a movement of the actuator away from the disconnector mechanism, thereby releasing the moveable member from engagement with the engagement surface and allowing a movement of the disconnector shaft from the first position to the second position.

The disconnector system according to any preceding clause, further comprising at least one actuator biasing member arranged to bias the actuator away from the disconnector shaft.

The disconnector system according to any preceding clause, wherein the meltable element is replaceable subsequent to the melting.

The disconnector system according to any preceding clause, wherein the housing defines a first inset cavity, the meltable element and solenoid being disposed in the first inset cavity.

The disconnector system according to any preceding clause, wherein the housing defines a second inset cavity in fluid communication with the first inset cavity, and arranged to flowably receive the meltable element therein.

The disconnector system according to any preceding clause, wherein the drive shaft further includes a drive shaft biasing member arranged to bias the slidable coupler into engagement with the drive coupler.

The disconnector system according to any preceding clause, further comprising a control system communicatively coupled to the actuator, the control system including a set of sensors communicatively coupled to a controller module, the set of sensors configured to provide a respective sensor signal indicative of a value of a sensed parameter, wherein the controller module is configured to selectively provide an actuation signal to the actuator to trigger the operation of the actuator based on the respective sensor signal.

The disconnector system according to any preceding clause, wherein the sensed parameter is a temperature.

The disconnector system according to any preceding clause, wherein the controller module is configured to determine the value of the sensed parameter based on the respective sensor signal, and to compare the determined value with a threshold value, and when the determined value satisfies the threshold value, provide the actuation signal to the actuator to trigger the operation of the actuator.

The disconnector system according to any preceding clause, wherein the threshold value is a predetermined threshold value stored in a memory.

The disconnector system according to any preceding clause, wherein the control system further includes a user interface communicatively coupled to the actuator, the user interface configured to provide an interface signal to the controller module.

The disconnector system according to any preceding clause, wherein the user interface is a switch.

The disconnector system according to any preceding clause, wherein the opposing second end of the disconnector shaft includes a shaft handle, wherein the disconnector shaft can be reset from the second position to the first position by manually pulling the shaft handle in a direction opposing a bias of the disconnector biasing element.

The disconnector system according to any preceding clause, wherein the drive mechanism further includes a shear coupler configured to shear at a predetermined torque threshold to define a first sheared portion and a second sheared portion, the shear coupler defining a cavity therein, the disconnector system further including a shear coupler biasing member disposed in the cavity and arranged to further separate the first and second sheared portions.

The disconnector system according to any preceding clause, wherein the shear coupler includes an annular shear portion defining a necked down region configured to shear at the predetermined torque threshold.

The disconnector system according to any preceding clause, wherein the shear coupler biasing member is a compression spring.

A disconnector system for disconnecting a drive mechanism from rotating equipment, the drive mechanism including a drive shaft having a first shaft portion, a second shaft portion, and a shear coupler configured to shear at a predetermined torque threshold to define a first sheared portion and a second sheared portion, the shear coupler defining a cavity therein, the disconnector system comprising: a shear coupler biasing member disposed in the cavity and arranged to further separate the first and second sheared portions.

Therefore, the following is claimed:

1. A disconnector system for disconnecting a drive shaft of a drive mechanism from rotating equipment, the drive shaft including a first shaft portion, a slidable coupler rotatably engaged with a drive coupler, and a second shaft portion, the drive mechanism including a housing, the disconnector system comprising:

a disconnector mechanism including:

a casing, a disconnector shaft partially disposed within the casing, the disconnector shaft moveable relative to the casing between a first position and a second position, the disconnector shaft having a first end, an opposing second end defining a cam surface, and an intermediate shaft portion extending between the first end and the second end, the intermediate shaft portion having an engagement surface; and a disconnector biasing element disposed between the casing and the disconnector shaft and arranged to bias the disconnector shaft toward the second position;

an actuator having a body and a moveable member, the moveable member selectively moveable between a third position and a fourth position, the moveable member being engaged with the engagement surface when in the third position to restrain the disconnector shaft in the first position against the bias of the first biasing disconnect biasing element, the moveable member being disengaged from the engagement surface when in the fourth position; and a meltable element disposed between the housing and the actuator body, the meltable element being in thermal communication with the housing and positioned to prevent a movement of the actuator away from the disconnector mechanism;

wherein, when the disconnector shaft is in the first position, the cam surface is radially spaced from the slidable coupler of the drive shaft, wherein, when the disconnector shaft is in the second position, the cam surface engages the slidable coupler to cause a movement of the slidable coupler to rotatably disengage the slidable coupler from the drive coupler;

wherein the disconnector system further comprises a control system communicatively coupled to the actuator, the control system including a set of sensors communicatively coupled to a controller module, the set of sensors configured to provide a respective sensor signal indicative of a value of a sensed parameter, wherein the controller module is configured to selectively provide an actuation signal to the actuator to trigger the operation of the actuator based on the respective sensor signal; and wherein the drive mechanism further includes a shear coupler configured to shear at a predetermined torque threshold to define a first sheared portion and a second sheared portion, the shear coupler defining a cavity therein, the disconnector system further including a shear coupler biasing member disposed in the cavity and arranged to further separate the first and second sheared portions.

2. The disconnector system of claim 1, wherein an operation of the actuator allows the moveable member to move from the third position to the fourth position.

3. The disconnector system of claim 1, wherein the meltable element is configured to melt at a threshold temperature indicative of a failure in at least one of the drive mechanism or the rotating equipment.

4. The disconnector system of claim 3, wherein a melting of the meltable element will cause a movement of the actuator away from the disconnector mechanism, thereby releasing the moveable member from engagement with the engagement surface and allowing a movement of the disconnector shaft from the first position to the second position.

5. The disconnector system of claim 4, further comprising at least one actuator biasing member arranged to bias the actuator away from the disconnector shaft.

6. The disconnector system of claim 4, wherein the meltable element is replaceable subsequent to the melting.

7. The disconnector system of claim 3, wherein:

the actuator is a solenoid; and the housing defines a first inset cavity, the meltable element and solenoid being disposed in the first inset cavity.

8. The disconnector system of claim 7, wherein the housing defines a second inset cavity in fluid communication with the first inset cavity, and arranged to flowably receive the meltable element therein.

9. The disconnector system of claim 1, wherein the drive shaft further includes a drive shaft biasing member arranged to bias the slidable coupler into engagement with the drive coupler.

10. The disconnector system of claim 1, wherein the sensed parameter is a temperature.

11. The disconnector system of claim 1, wherein the controller module is configured to determine the value of the sensed parameter based on the respective sensor signal, and to compare the determined value with a threshold value, and when the determined value satisfies the threshold value, provide the actuation signal to the actuator to trigger the operation of the actuator.

12. The disconnector system of claim 11, wherein the threshold value is a predetermined threshold value stored in a memory.

13. The disconnector system of claim 1, wherein the control system further includes a user interface communicatively coupled to the actuator, the user interface configured to provide an interface signal to the controller module.

14. The disconnector system of claim 13, wherein the user interface is a switch.

15. The disconnector system of claim 1, wherein the first end of the disconnector shaft includes a shaft handle, wherein the disconnector shaft can be reset from the second position to the first position by manually pulling the shaft handle in a direction opposing a bias of the disconnector biasing element.

16. The disconnector system of claim 1, wherein the shear coupler includes an annular shear portion defining a necked down region configured to shear at the predetermined torque threshold.

17. The disconnector system of claim 1, wherein the shear coupler biasing member is a compression spring.

18. The disconnector system of claim 1, wherein the control system provides a primary disconnect operation, the shear coupler provides a secondary disconnect operation, and the meltable element provides a tertiary disconnect operation.

* * * * *